United States Patent Office 2,998,417
Patented Aug. 29, 1961

2,998,417
METHOD FOR IMPROVING FILTERABILITY OF PHOSPHOSULFURIZED HYDROCARBONS
Richard E. Merz, Berkeley Heights, John A. Brown, Metuchen, and William C. Dowling, Cranford, N.J., assignors to Esso Research and Engineering Company, a corporation of Delaware
No Drawing. Filed Dec. 2, 1958, Ser. No. 777,585
5 Claims. (Cl. 260—139)

This invention is concerned with an improved method for the preparation of neutralized phosphosulfurized hydrocarbons to obtain additives that impart detergency, extreme pressure and other properties to lubricants. More particularly, this invention is concerned with a method for improving the filterability of neutralized phosphosulfurized hydrocarbons by the addition of alkaline earth metal salts of sulfurized phenols and/or alkaline earth metal sulfonates to the hydrocarbon prior to reaction with the phosphorus sulfide.

It is known in the prior art to phosphosulfurize hydrocarbons and petroleum fractions to obtain lubricating oil additives. U.S. patent application S.N. 654,990, now U.S. 2,875,188 discloses that the addition of trace amounts, in the range of 0.0001 to 0.9 wt. percent of the metal salts of sulfurized phenols will act as a catalyst and greatly accelerate the phosphosulfurization reaction. U.S. application S.N. 716,394 teaches the art of neutralizing and filtering a phosphosulfurized hydrocarbon or petroleum fraction to obtain an excellent lube oil additive. This neutralization step involves reacting the phosphosulfurized hydrocarbon with a basic reacting alkaline earth metal salt of an organic compound selected from the group consisting of alkyl phenols, alkyl phenol sulfides, sulfonates and mixtures thereof under essentially anhydrous conditions.

The above procedures lead to the preparation of excellent neutralized phosphosulfurized hydrocarbon additives for lubricating oil compositions. However, extreme difficulty has been encountered in filtering these neutralized and phosphosulfurized hydrocarbon products when prepared with or without catalysis according to these procedures. This difficulty is due to the presence of traces of insoluble sticky gums and gels which blind the filter cake and plug the press in the commercial preparation and filtration of the additive. The exact cause of these gums and gels is not known. It has been found, however, and this finding forms the basis of the present invention, that if at least 0.4% by weight of an alkaline earth metal salt of a sulfurized phenol, an alkaline earth metal sulfonate or a mixture of these two salts, is added to the hydrocarbon material before treating with phosphorus sulfide, the formation of these gums and gels will be prevented. It has also been found that alkaline earth metal sulfonates, either when used alone or in admixture with the salts of a sulfurized phenol, will serve as an excellent catalyst in the phosphosulfurization reaction in addition to preventing the formation of gums and gels upon neutralization of the phosphosulfurized product. Excessively large amounts of the above alkaline earth metal salts must be avoided since such materials or their reaction products appear in, and undesirably effect, the final product leading to the formation of haze and sediment. It is equally essential that the metal salt be added to the hydrocarbon material prior to addition of the phosphorus sulfide since addition of the metal salt to a hydrocarbon material containing phosphorus sulfide is ineffective and may actually promote haze and sediment.

As stated above, the use of trace amounts of alkaline earth metal salts of sulfurized phenols is known to serve as an excellent catalyst for the phosphosulfurization reaction. Both the alkaline earth metal sulfonates and phenol sulfides have also been used to neutralize phosphosulfurized hydrocarbons. The use of these salts as a catalyst or as a neutralizing agent, however, differs from their use in preventing the formation of gums and gels. When these salts are used in accordance with the present invention to prevent the formation of gums and gels, a higher concentration of the salts than is normally required for catalysis, and a much lower concentration than that required for neutralization, is added directly to the hydrocarbon material. Further, addition of the salts to the hydrocarbon material prior to the addition of the phosphorus pentasulfide is essential if the filterability of the neutralized product is to be improved.

This invention, therefore, proposes a method for improving the filterability of neutralized phosphosulfurized hydrocarbons by adding in the range of 0.4 to 4.0 wt. percent and preferably between 0.4 and 1.0 wt. percent (based on the weight of hydrocarbon) of the alkaline earth metal salt of a sulfurized phenol and/or an alkaline earth metal sulfonate to the hydrocarbon material prior to the addition of, and treatment with, phosphorus sulfide. After treating the hydrocarbon material with the above metal salt or salts, the mixture is treated and reacted with a phosphorus sulfide preferably phosphorus pentasulfide at a temperature in the range of 350 to 600° F. to obtain a phosphosulfurized product containing about 1 mol phosphorus per two mols of hydrocarbon and about 2 mols of sulfur per 2 mols of hydrocarbon. The phosphosulfurized hydrocarbon is then neutralized with a basic reacting alkaline earth metal salt of an organic compound selected from the group consisting of alkyl phenols, alkyl phenol sulfides, sulfonates and mixtures thereof under essentially anhydrous conditions. Following neutralization the phosphosulfurized hydrocarbon is filtered to obtain a relatively clear product useful as a lubricating oil additive.

The metal salts useful in preventing gum and gels are the alkaline earth metal salts of oil-soluble sulfurized phenols and alkaline earth metal sulfonates. The preferred metal-salts are calcium and barium. Mixtures containing 20 to 80% by weight of high alkalinity calcium or barium phenol sulfide and 80 to 20% by weight of high alkalinity calcium or barium sulfonates are preferred. Mixtures containing 40 to 60% by weight of the barium phenol sulfide and 60 to 40% by weight of barium sulfonate are particularly preferred. These high alkalinity materials are obtained by using an excess of calcium or barium hydroxide during their preparation, as described in U.S. patent application S.N. 716,394.

The phenol sulfides are known to the art and can be made in several ways. For example, an alkyl substituted phenol can be reacted with $SCl_2$ or elemental sulfur, preferably in the presence of a solvent, to obtain a mono-, di- or polysulfide, as desired. The sulfide so obtained can then be reacted with an alkaline earth oxide or hydroxide to form the salt. It is preferred, for the purposes of this invention, to use alkylated phenols having alkyl side chains containing from 6 to 12 carbon atoms. The high alkalinity salts are obtained by employing an excess of the alkaline earth metal oxide or hydroxide. The excess oxide or hydroxide will normally be in the range of 30 to 50% based on the equivalents of the phenol sulfide metal salt. The preparation of alkaline earth phenol sulfides is more fully described in U.S. 2,362,291; U.S. 2,362,292; and other patents.

The oil-soluble alkaline earth metal sulfonates which can be used alone or admixed with the phenol sulfides will be derived from sulfonic acids having molecular weights in the range of 300 to 800, e.g., 400 to 600. These sulfonates are prepared, for example, by reacting barium or calcium hydroxide with a sulfonic acid obtained by sulfuric acid treatment of a synthetic alkyl benzene. The high alkalinity sulfonates are obtained by using an excess of the alkaline earth hydroxide in the above reaction, preferably about 100 to 150% of excess hydroxide based on the equivalents of the sulfonate metal salt.

While broadly any hydrocarbon material, e.g., paraffin waxes, can be subjected to phosphosulfurization in the manner of this invention, there are two substantially aliphatic hydrocarbon feed stocks that are of interest: $C_2$ to $C_{10}$ monoolefin polymers having a molecular weight in the range of 250 to 100,000, e.g., 250 to 2,500, and petroleum bright stocks remaining as residues after the distillation of crude oil at temperatures above about 700° F. Generally these bright stocks will be further treated by deasphalting, dewaxing, solvent extraction, filtration or a combination of these methods.

The monoolefin polymers useful in this invention are exemplified by olefin polymers such as polyethylene, polypropylene and polyisobutylene. It is intended to include, besides homopolymers, copolymers of monoolefins with other olefins such as isoprene, and with other materials such as styrene and similar vinyl compounds. The preferred polymers used have a molecular weight in the range of 250 to 2,500 and are freely soluble in heptane at 70° F. Polyisobutylene is particularly preferred.

The petroleum bright stocks useful in this invention are the residues which remain after distilling crude oils to produce distillate fuels and lubricating oils. The residues may be deasphalted, dewaxed, solvent extracted, filtered or a combination of these to give materials having viscosities above 100 SUS at 210° F. and viscosity indices above 80. Suitable crude oils are Pennsylvania and Mid-Continent. Bright stocks can also be obtained from catalytic cracking cycle stocks. Such bright stocks useful for phosphosulfurization are recognized products of petroleum refining and need no further definition.

Any sulfide of phosphorus can be used in this invention or even the elements themselves, in combination, can be used. Phosphorus pentasulfide, $P_2S_5$, is preferred. About 1/4 of a mole of $P_2S_5$ per mole of hydrocarbon is used. This is generally sufficient to incorporate 1 mole of phosphorus and 2 moles of sulfur in the final product of the phosphosulfurization reaction.

The phosphosulfurization reaction may be carried out in any suitable reaction zone, e.g., metal or glass, laboratory or plant, reaction vessels can be used. The reaction temperature is in the range of 350° to 600° F., preferably 425-500° F. Pressure is not too material to the reaction, but should be sufficient to prevent vaporization of the reactants and will normally be under 2 atmospheres. It is preferred to manitain a non-oxidizing atmosphere in the reaction zone and, therefore, the reaction can be carried out under a blanket of nitrogen, carbon monoxide, refinery inert gas, fuel gas, etc. Generally, the inert gas is used as a stripping gas during the reaction and the reaction mass is agitated. The reaction is considered complete when a cooled sample at room temperature will remain bright, i.e., free from haze and sediment, for at least 2 hours.

The phosphosulfurized reaction product is then neutralized with a high alkalinity alkaline earth metal salt of an organic compound selected from the group consisting of alkyl phenols, alkyl phenol sulfides, alkalined earth metal sulfonates, and mixtures thereof. The high alkalinity barium or calcium metal salts (i.e., those prepared by use of an excess of calcium or barium hydroxide) are preferred.

The high alkalinity alkaline earth metal sulfonates and phenol sulfides used to neutralize the phosphosulfurized product are the same as the gum and gel preventive agents described above. The high alkalinity alkaline earth metal salts of alkyl phenols are described in U.S. 2,197,833 and U.S. application Serial No. 716,394. These salts are prepared by reacting an excess of an alkaline earth metal hydroxide with an alkyl phenol. The excess of alkaline earth hydroxide is in the range of 30 to 50%, based on the equivalents of metal alkyl phenate formed.

It is important in the neutralization step that the proper amount of the high alkalinity metal salt be employed. The weight of the high alkalinity metal salt employed times its alkaline neutralization number to a pH of 4 should exceed the weight of the phosphosulfurized hydrocarbon times its saponification number. The alkaline neutralization number is the amount of acid expressed as equivalent to milligrams of potassium hydroxide which is required to react with one gram of the high alkalinity material to produce a pH of 4. The saponification number is the milligrams of potassium hydroxide necessary to saponify one gram of the phosphosulfurized hydrocarbon. For example, if it is desired to stabilize 100 grams of a phosphosulfurized hydrocarbon having a saponification number of 20, it is necessary to use at least 200 grams of the high alkalinity organic material having a neutralization number of 10.

The invention is further illustrated by the following examples.

EXAMPLE I

A. 1000 grams of polybutene were reacted on a laboratory scale with 150 grams of $P_2S_5$ at 425° F. under a nitrogen atmosphere, in a 3-necked, glass laboratory flask fitted with a glass stirrer, heating mantle, thermometer, thermoregulator, and $N_2$ bubbler. The reaction time was 8 hours in the absence of a catalyst. The polybutene used was obtained by the Friedel-Crafts polymerization of isobutylene (commercial product: Indopol H–300). This polybutene had an average molecular weight (Staudinger) of about 1100 with a molecular weight range of 500 to 5000 Staudinger.

B. The same hydrocarbon was phosphosulfurized according to the procedure outlined above to prepare more samples, except that in the first sample, 30 grams (3.0 wt. percent on hydrocarbon feed) of a high alkalinity barium nonyl phenol sulfide were added to the polybutene prior to the reaction with $P_2S_5$; and in the second sample 30 grams (3.0 wt. percent on hydrocarbon feed) of a high alkalinity barium sulfonate prepared from a sulfonic acid having a molecular weight of about 500 and obtained by reacting excess barium hydroxide with a sulfonic acid prepared by sulfuric acid treatment of a synthetic alkyl benzene. The above two phosphosulfurization reactions were completed in 2 hours due to the catalytic effect of the barium salts. The barium nonyl phenol sulfide used above had the following inspections:

| | |
|---|---|
| Barium, wt. percent | 12.0–12.8 |
| Sulfur, wt. percent | 2.8–3.2 |
| Neut. Nr. to pH of 4 | 73.0–93.0 |
| pH | 11 |

The barium sulfonate used above had the following inspections:

| | |
|---|---|
| Barium, wt. percent | 16.49 |
| Sulfur, wt. percent | 3.10 |
| Neut. Nr. to pH of 4 | 61.53 |
| Initial pH | 8.95 |

C. The same procedure as outlined in (B) above was repeated except that the metal salts were added after addition of the $P_2S_5$ to the polybutene. An additional run was made using 30 grams (3.0 wt. percent) of a mixture containing equal proportions (i.e., 1.5 wt. percent) of the above salts. These salts were added after the $P_2S_5$ had been added to the polybutene.

D. Each of the above products (i.e. the phosphosulfurized products of A, B and C above) were neutralized with a 50/50 mixture of high alkalinity barium sulfonate and barium nonyl phenol sulfide to give an essentially neutral product. Specifically, 36 parts by weight of $P_2S_5$-polybutene of A were mixed with 32 parts by weight of the barium sulfonate of B and 32 parts by weight of the barium nonyl phenol sulfide of B. The mixture was then heated at about 250 to 320° F. for about 4 hours to obtain a neutralized phosphosulfurized product. The table below shows the filterability of the neutralized phosphosulferized product obtained when the metal salts are added prior to addition of the $P_2S_5$ (paragraph B above) and when they are added after addition of the $P_2S_5$ (paragraph C above).

The filterability of the neutralized phosphosulfurized product was determined by laboratory filtration through a 5 cm. Buchner funnel equipped with Whatman No. 1 paper and Hi-Flo filter aid, at 300° F. and house vacuum. If more than about 300 grams of the product at 300° F. temperature and 1 atmosphere pressure passed through the filter in 75 minutes or less, the filterability was classed as good. If clogging of the filter occurred and less than about 150 grams filtered within 75 minutes, the filterability was classed as poor.

Table I

FILTERABILITY OF THE NEUTRALIZED PHOSPHOSULFURIZED POLYBUTENE OF EXAMPLE IA

| Wt. Percent [1] Ba Salt Added Before $P_2S_5$ | Wt. Percent [1] Ba Salt Added After $P_2S_5$ | Reaction Time | Filterability gm./75 min. | Rating |
|---|---|---|---|---|
| None | None | 8 | 68 | Poor. |
| 3% Nonyl phenol sulfide. | do | 2 | 376 | Good. |
| 3% Sulfonate | do | 2 | 358 | Good. |
| None | do | 8 | 105 | Poor. |
| Do | do | 2 | 30 | Poor. |
| Do | 3% Nonyl phenol sulfide. | 2 | 59 | Poor. |
| Do | 3% Sulfonate | 2 | 57 | Poor. |
| Do | {1.5 Nonyl phenol sulfide. 1.5 Sulfonate} | 2 | 57 | Poor. |

[1] Wt. percent based on weight of polybutene employed.

This table shows that the addition of the alkaline earth phenol sulfides and/or sulfonates must be made prior to the addition of the $P_2S_5$ if the filterability of the subsequently neutralized phosphosulfurized product is to be improved. It also shows that alkaline earth metal sulfonates are effective catalysts in the phosphosulfurization of hydrocarbons.

EXAMPLE II

The following example was conducted at plant scale by reacting 3,670 lbs. of the polybutene of Example I with 552 lbs. of $P_2S_5$ in a 2,000 gal. glass-lined Pfaudler kettle with associated heating and feed lines. The reaction was carried out by reacting at a temperature between 430° to 440° F. under a nitrogen atmosphere with agitation. The reaction time to completion was about 4 hours. In this plant scale phosphosulfurization reaction repeated runs were made wherein different amounts (as shown in Table II) of a mixture, comprising roughly equal proportions by weight of the high alkalinity barium nonyl phenol sulfide and barium sulfonate of Example I, were added to the polybutene prior to addition of the $P_2S_5$.

The phosphosulfurized polybutene products were then neutralized by the addition of the high alkalinity barium nonyl phenol sulfide and barium sulfonate of Example I. Approximately 32 parts by weight of each of the high alkalinity salts were added for every 36 parts by weight of the phosphosulfurized polybutene.

The filterability of the neutralized phosphosulfurized products obtained is given in the following table. The proportion of metal salts added prior to addition of $P_2S_5$ and phosphosulfurization are expressed as total weight percent barium (based on weight of polybutene) present in the reaction mixture (i.e., weight percent barium present prior to neutralization).

In the plant scale operation a 200 square foot plate and frame filter press were used. If 5000 gal. of the product at 300° F. temperature and 30 p.s.i.g. pressure passed through the filter in less than 2 hours, the filterability was classed as good. If clogging of the filter occurred and the product could not be filtered within 6 hours, the filterability was classed as poor.

Table II

FILTERABILITY (PLANT SCALE)

| Runs | Wt. percent barium (Added) | Filterability |
|---|---|---|
| 1 | 0.24 | Good. |
| 2 | 0.29 | Good. |
| 3 | 0.19 | Good. |
| 4 | 0.239 | Good. |
| 5 | 0.15 | Good. |
| 6 | 0.20 | Good. |
| 7 | 0.22 | Good. |
| 8 | 0.08 | Good. |
| 9 | 0.64 | Good. |
| 10 | 0.64 | Good. |
| 11 | 0.03 | Poor. |
| 12 | 0.04 | Poor. |
| 13 | 0.05 | Good. |
| 14 | 0.44 | Good. |
| 15 | 0.04 | Poor. |

The above table shows that at least 0.05 wt. percent barium or approximately 0.4 wt. percent, based on weight of hydrocarbon feed, of the barium salts must be added to the polybutene prior to phosphosulfurization in order to improve the filterability of the final neutralized product.

EXAMPLE III

As an example of the use of the alkaline earth metal salts of this invention to improve the filterability of other neutralized phosphosulfurized hydrocarbon materials, 1.0 wt. percent (based on weight of hydrocarbon feed) of a mixture of equal molar proportions of a high alkalinity calcium nonyl phenol sulfide and a high alkalinity calcium sulfonate are added to a deasphalted, dewaxed Panhandle residuum having a viscosity index of 95, a viscosity of 165 SUS at 210° F. and an API gravity of 24.8. This mixture is then reacted with 15 wt. percent of $P_2S_5$ at 430° F. for 6 to 8 hours to give a product which after neutralization with high alkalinity barium dodecyl phenate may be readily filtered.

What is claimed is:
1. In a process wherein a phosphorus sulfide is reacted at 350–600° F. with a hydrocarbon material having a molecular weight in the range of 250 to 100,000, and the reaction product is neutralized with an alkaline earth metal salt of an organic compound selected from the group consisting of alkyl phenol sulfides, alkyl phenols, sulfonates wherein said sulfonates are derived from aromatic sulfonic acids having molecular weights in the range of 300 to 800, and mixtures thereof, to obtain a neutralized phosphosulfurized hydrocarbon product useful as a lubricating oil additive containing about 1 mole of phosphorus and about 2 moles of sulfur per two mols of hydrocarbon; the improvement which comprises increasing the filterability of said neutralized phososulfurized hydrocarbon product by adding to said hydrocarbon material, prior to the addition of the phosphorus sulfide, in the range of 0.4 to 4.0 weight percent based on the weight of said hydrocarbon material of an oil soluble metal salt of an organic compound selected from the group consisting of the alkaline earth metal salts of alkyl phenol sulfides having from 6–12 carbon atoms per alkyl group, alkaline earth metal sulfonates derived from aromatic sulfonic acids having molecular weights of from 300–800, and mixtures thereof.

2. The process according to claim 1, wherein said hydrocarbon material is a monoolefin polymer having a molecular weight in the range of 250 to 2,500.

3. The process according to claim 1, wherein said hydrocarbon material is a deasphalted, dewaxed petroleum bright stock having a viscosity index of above 80 and a viscosity above 100 SSU at 210° F.

4. The process according to claim 1, wherein 1.0 weight percent, based on the weight of said hydrocarbon material, of said oil soluble metal salts are added to said hydrocarbon material prior to the addition of 15 weight percent based on the weight of said hydrocarbon material of phosphorus pentasulfide.

5. The process according to claim 1 wherin 3 wt. percent of said oil soluble metal salt is added to said hydrocarbon material prior to the addition of said phosphorous sulfide.

References Cited in the file of this patent

UNITED STATES PATENTS

| | | |
|---|---|---|
| 2,690,445 | Corcoran et al. | Sept. 28, 1954 |
| 2,875,188 | Brown | Feb. 24, 1959 |